United States Patent Office 2,817,657
Patented Dec. 24, 1957

2,817,657

COBALTIFEROUS MONOAZO-DYESTUFFS

Arthur Buehler, Rheinfelden, and Christian Zickendraht, Binningen, Switzerland, assignors to Ciba Limited, Basel, Switzerland, a Swiss firm No Drawing. Application November 13, 1953
Serial No. 392,031

Claims priority, application Switzerland
November 22, 1952

4 Claims. (Cl. 260—151)

This invention provides a process for the manufacture of valuable new cobaltiferous monoazo-dyestuffs, wherein a monoazo-dyestuff which is free from sulfonic acid and carboxylic acid groups, and corresponds to the general formula (1)

in which R represents an aromatic radical of the benezene series which contains a hydroxyl group in ortho-position relatively to the azo linkage, $Y_1$ represents a substituted sulfonic acid amide group, and $R_1$—OH represents the radical of a 2-hydroxynaphthalene bound in the 1-position to the azo-linkage is treated with an agent yielding cobalt under conditions such that the resulting cobaltiferous dyestuff contains less than one atom of cobalt in complex union per molecule of dyestuff.

The monoazo-dyestuffs of the above formula serving as starting materials can be made by coupling an ortho-hydroxy-diazo-benzene compound free from sulfonic acid and carboxylic acid groups with a 2-hydroxynaphthalene sulfonic acid amide which is free from sulfonic acid and carboxylic acid groups and contains a substituted sulfonic acid amide group. There came into consideration mono- and di-substituted sulfonic acid amide groups, that is to say, substituents of the formula

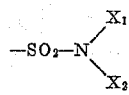

in which $X_1$ represents a hydrogen atom or an aliphatic radical and $X_2$ represents an aliphatic, alicyclic, araliphatic or aromatic radical or together with $X_1$ and —N— forms a heterocyclic nucleus, and advantageously substituents of the formula

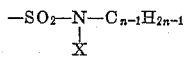

in which $n$ is a whole number not greater than 7, and X represents an alkyl or aryl radical.

In addition to the amino group and the hydroxyl group the benzene radical of the diazo component may contain further substituents, such as sulfonic acid amide groups and substituents that do not impart solubility in water, such as halogen atoms (for example, chlorine), alkyl groups (for example, methyl), alkoxy groups (for example, methoxy), nitro groups, —CO—alkyl groups (for example, —CO—$CH_3$). Especially valuable are the diazo compounds of the following ortho-hydroxy-amines: 4-methyl-2-amino-1-hydroxybenzene, 4-methoxy-2-amino-1-hydroxybenzene, 4-chloro-2-amino-1-hydroxybenzene, 4-nitro-2-amino-1-hydroxybenzene, 5-nitro-2-amino-1-hydroxybenzene, 6-acetylamino-4-chloro- or -4-nitro-2-amino-1-hydroxybenzene, 5-nitro-4-chloro-2-amino-1-hydroxybenzene, 6-nitro-4-chloro-2-amino-1-hydroxybenzene, 6-nitro-4-methyl-2-amino-1-hydroxybenzene, 3-amino-4-hydroxy-acetophenone, 6-nitro-4-acetylamino-2-amino-1-hydroxybenzene, 5-nitro-3-amino-4-hydroxyacetophenone, 2-amino-1-hydroxybenzene-4-carboxylic acid amide, 4:6-dinitro-2-amino-1-hydroxybenzene, 4:6-dichloro-2-amino-1-hydroxybenzene, 4-nitro-6-chloro-2-amino-1-hydroxybenzene, 6-nitro- or 6-chloro-2-amino-1-hydroxybenzene-4-sulfonic acid methylamide, 2-amino-1-hydroxybenzene-4-sulfonic acid methyl-, -ethyl-, -isopropyl-, -butyl- or -hydroxyethylamide, 2-amino-1-hydroxybenzene-4-sulfonic acid dimethyl-, -diethyl- or -dihydroxyethylamide, 2-amino-1-hydroxybenzene-4-sulfonic acid cyclohexylamide, 2-amino-1-hydroxybenzene-4-sulfonic acid phenyl- or -N-methyl-phenylamide, 2-amino-1-hydroxybenzene-4-sulfonic acid p-tolyl- or -p-chlorphenylamide, 2-amino-1-hydroxybenzene-4-sulfonic acid pyrrolidide and the corresponding 2-amino-1-hydroxybenzene-5-sulfonic acid amides and also ortho-hydroxyaminobenzenes containing unsubstituted sulfonic acid amide groups, such as 6-chloro- or 6-nitro-2-amino-1-hydroxybenzene-4-sulfonic acid amide, 4-chloro-2-amino-1-hydroxybenzene-6-sulfonic acid amide, 2-amino-1-hydroxybenzene-4- or -5-sulfonic acid amide and 4-chloro- or 4-methoxy-2-amino-1-hydroxybenzene-5-sulfonic acid amide.

For making the monoazo-dyestuffs there are used as coupling components 2-hydroxynaphthalenes, which contain a substituted sulfonic acid amide group, such for example, as 2-hydroxynaphthalene-6-sulfonic acid methyl-, -dimethyl-, -ethyl-, -diethyl-, -butyl-, -phenyl-, -4'-chlorophenyl- or -N-methylphenylamide, and the corresponding 2-hydroxynaphthalene-3-, -4-, -5- or -7-sulfonic acid amides.

The coupling can be carried out by a method in itself known, advantageously in an alkaline medium, for example, a medium rendered alkaline with an alkali carbonate and/or an alkali hydroxide.

After the coupling reaction, the dyestuffs, for the purpose of metallization, can easily be isolated from the coupling mixtures by filtration, because they are only slightly soluble in water. For the purpose of metallization they are advantageously used in the form of their filter cakes without intermediate drying. In some cases it is possible to carry out the metallization directly in the coupling mixture without any intermediate isolation of the dyestuff.

The monoazo-dyestuffs obtainable as described above and used as starting materials in the present process are in general not very easily soluble in water even in the form of their alkali compounds. However, some of them are sufficiently soluble in that form to enable them to be used for dyeing from dyebaths which need no addition of acid, for example, by the single bath chroming process.

The treatment with the agent yielding cobalt is carried out in accordance with the present invention under conditions such that the resulting cobaltiferous dyestuff contains, per molecule of dyestuff, less than one atom of cobalt in complex union. Accordingly, the metallization is advantageously carried out with the aid of such agents yielding cobalt and by such methods that complex cobalt compounds of the aforesaid constitution are obtained. It is generally of advantage to use less than one atomic proportion of cobalt for every molecular proportion of dyestuff and/or to carry out the metallization in a weekly acid to alkaline medium. Accordingly, there are especially suitable for carrying out the process cobalt compounds which are stable towards alkaline media, for example, complex cobalt compounds of aliphatic hydroxycarboxylic acids or dicarboxylic acids. As examples of aliphatic-carboxylic acids or dicarboxylic acids there may be mentioned inter alia, oxalic acid, lactic acid, glycollic acid, citric acid and especially tartaric acid. As agents yielding cobalt there may, however, be used simple compounds of divalent cobalt such as cobalt acetate or cobalt sulfate and if desired cobalt hydroxide.

The conversion of the dyestuffs into their complex cobalt compounds is advantageously carried out at a raised temperature, under atmospheric or superatmospheric pressure, for example, at the boiling temperature of the reaction mixture, if desired in the presence of a suitable addition, for example, a salt of an organic acid, a base, an organic solvent or other agents assisting the formation of complexes.

In a particular form of the process there is used as starting material a mixture of two different metallizable monoazo-dyestuffs, both of which are free from sulfonic acid and carboxylic acid groups, and at least one of which, but advantageously both, corresponds to the above Formula 1. It will be understood that in this case the treatment with the agent yielding cobalt is also carried out under conditions such that cobaltiferous dyestuffs are formed which contain less than one atom of cobalt in complex union per molecule of dyestuff.

The products of the process of the invention are new. They are complex cobalt compounds which contain more than one, and advantageously 2, molecules of monoazo-dyestuff bound in complex union with one atom of cobalt, the monoazo-dyestuffs bound to the cobalt atom being free from sulfonic acid and carboxylic acid groups and at least one of them, and advantageously both monoazo-dyestuffs, corresponding to the above general Formula 1.

Especially valuable are the products of this kind, which contain two monoazo-dyestuffs both of which correspond to the above Formula 1, and more especially those products which contain two monoazo-dyestuffs of the same constitution.

The products are soluble in water and weakly acid aqueous media, and are in fact more soluble than the metal-free initial dyestuffs used for making them. They are suitable for dyeing and printing a very wide variety of materials, and above all for dyeing animal materials such as silk, leather and especially wool, but also for dyeing and printing synthetic fibers of a superpolyamide or a superpolyurethane. In contradistinction to chromium compounds of dyestuffs containing sulfonic acid groups, which compounds are advantageously applied for dyeing from strongly acid baths, for example, sulfuric acid baths, the new cobalt compounds of monoazo-dyestuffs free from sulfonic acid groups are especially suitable for dyeing from weakly alkaline, neutral to weakly acid, and advantageously acetic acid baths. Wool dyeings so obtained are distinguished by their level character, good properties of wet fastness and very good fastness to light.

The following examples illustrate the invention, the parts and percentages being by weight unless otherwise stated and the relationship of parts by weight to parts by volume being the same as that of the kilogram to the liter.

Example 1

18.8 parts of 2-amino-1-hydroxybenzene-4-sulfonic acid amide are suspended in 200 parts of water and 15 parts by volume of 10 N-hydrochloric acid and diazotized at 5 to 10° C. with 25 parts by volume of a 4 N-solution of sodium nitrite. The diazo compound is neutralized by the addition of sodium carbonate, and run into a solution, cooled with ice to 0° C., of 29.9 parts of 2-hydroxynaphthalene-6-sulfonic acid phenylamide, 4 parts of sodium hydroxide, 5.3 parts of sodium carbonate and 200 parts of water. When the coupling is finished the dyestuff is completely precipitated and filtered off, and if desired dried.

24.9 parts of the dyestuff so obtained are dissolved in 4 parts of sodium hydroxide in 1000 parts of water at 80° C., and mixed with 50 parts of a solution of cobalt sulfate having a cobalt content of 3.25 percent. After stirring the mixture for about ½ hour the metallization is complete. The dyestuff solution so obtained is, if necessary, freed from impurities by filtration, then neutralized by the addition of acetic acid, and evaporated to dryness. The cobalt complex so obtained is a violet powder which dissolves in water with a pure red coloration and in concentrated sulfuric acid with an orange coloration, and dyes wool equally well from a weakly alkaline, neutral or acetic acid bath bordeaux tints which are fast to light and washing.

In the following table are given further complex cobalt compounds which can be obtained by the process of this example by using, instead of the diazo, and azo components mentioned above, those given in columns I and II of the table. In column III is given the tint of the dyeing obtainable on wool by applying the complex cobalt compound from an acetic acid bath.

| | I | II | III |
|---|---|---|---|
| 1 | 2-amino-1-hydroxybenzene with SO₂NH₂ substituent (OH, NH₂, SO₂NH₂) | 2-hydroxynaphthalene-SO₂—NH—CH(CH₃)₂ | bordeaux. |
| 2 | 2-amino-1-hydroxybenzene with SO₂NH₂ substituent | 2-hydroxynaphthalene-SO₂NH—CH₃ | violet. |
| 3 | 2-amino-1-hydroxy-chlorobenzene (OH, NH₂, Cl) | 2-hydroxynaphthalene-SO₂NH—CH₃ | reddish violet. |
| 4 | 2-amino-1-hydroxy-chlorobenzene (OH, NH₂, Cl) | 2-hydroxynaphthalene-SO₂—NH—CH(CH₃)₂ | Do. |

| | I | II | III |
|---|---|---|---|
| 5 | 2-amino-4-chlorophenol | HO-naphthyl-SO₂NH—(CH₂)₃CH₃ | reddish violet. |
| 6 | 2-amino-4-(N-hydroxyethylsulfamoyl)phenol | HO-naphthyl-SO₂NH—CH(CH₃)₂ | bordeaux. |
| 7 | 2-amino-4-(N,N-dimethylsulfamoyl)phenol | HO-naphthyl-SO₂NHCH₃ | Do. |
| 8 | 2-amino-4-(N-methylsulfamoyl)phenol | HO-naphthyl-SO₂NH—CH(CH₃)₂ | Do. |
| 9 | 2-amino-5-sulfamoylphenol | HO-naphthyl-SO₂—NH—C₆H₅ | red-violet. |
| 10 | 2-amino-4-nitrophenol | HO-naphthyl-SO₂—NH—CH₂CH₂OH | bordeaux. |
| 11 | 2-amino-4-chloro-5-sulfamoylphenol | HO-naphthyl-SO₂NH—C₆H₅ | violet. |

*Example 2*

0.5 part of the cobaltiferous dyestuff obtainable as described in Example 1 is dissolved in 4000 parts of water, 10 parts of crystalline sodium sulfate are added, and 100 parts of well wetted wool are entered at 40 to 50° C., into the dyebath so prepared. Then 3 parts of acetic acid of 40 percent strength are added, the temperature is raised to the boil in the course of ½ hour and dyeing is carried on at the boil for ¾ hour. Finally the wool is rinsed with cold water and dried. There is obtained a level bordeaux dyeing of good fastness to light.

Practically the same dyeing is obtained when no acetic acid is added to the dyebath, or when the wool is initially introduced into the dyebath previously heated to about 90° C.

What we claim is:

1. A complex cobalt compound containing one atom of cobalt in complex union with substantially two molecules of a monoazo-dyestuff free from sulfonic and carboxylic acid groups and corresponding to the formula

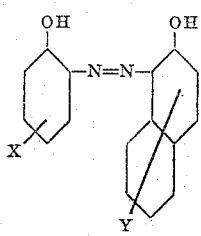

wherein X represents a member selected from the group consisting of a chlorine atom and a sulfonic acid amide group and Y represents a sulfonic acid amide group substituted by a member selected from the group consisting of a hydroxyethyl group and a saturated straight chain hydrocarbon radical containing up to six carbon atoms.

2. A complex cobalt compound containing one atom of cobalt in complex union with substantially two molecules of a monoazo-dyestuff free from sulfonic and carboxylic acid groups and corresponding to the formula

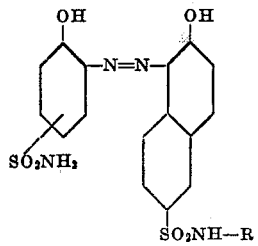

wherein R represents a saturated straight chain hydrocarbon radical containing up to 6 carbon atoms.

3. A complex cobalt compound containing one atom of cobalt in complex union with substantially two molecules of a monoazo-dyestuff free from sulfonic and carboxylic acid groups and corresponding to the formula

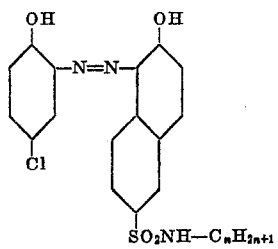

wherein $n$ represents a whole number up to 4.

4. The complex cobalt compound containing one atom of cobalt bound in complex union with two molecules of the monoazo-dyestuff of the formula

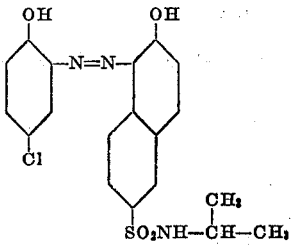

References Cited in the file of this patent

UNITED STATES PATENTS

| | | |
|---|---|---|
| 2,512,845 | Widmer et al. | June 27, 1950 |
| 2,534,646 | Widmer et al. | Dec. 19, 1950 |
| 2,565,898 | Widmer et al. | Aug. 28, 1951 |
| 2,671,081 | Billings et al. | Mar. 2, 1954 |
| 2,727,032 | Buehler et al. | Dec. 13, 1955 |